UNITED STATES PATENT OFFICE.

CHARLES MARGOT, OF GENEVA, SWITZERLAND.

DECORATING GLASS WITH ALUMINIUM.

SPECIFICATION forming part of Letters Patent No. 527,210, dated October 9, 1894.

Application filed March 28, 1894. Serial No. 505,391. (Specimens.)

*To all whom it may concern:*

Be it known that I, CHARLES MARGOT, of Geneva, Switzerland, have invented an Improvement in Decorating Glass, Porcelain, and the Like, of which the following is a specification.

Heretofore glass, porcelain and similar vitreous articles have been ornamented by painting upon the surface a gold or silver preparation and firing the same to cause such material to adhere.

I have discovered that the surface of glass or other vitreous articles can be ornamented by bringing into contact with the vitreous surface, when clean, a stylus or marker of aluminum or its alloys and pressing and moving the same upon the surface, so as to draw or produce the desired patterns or figures, there being a sufficient adhesion between the glass and the aluminum stylus or marker to produce a transfer of sufficient of the metal to the glass to form a permanent surface ornament that is not easily removed by the friction incident to the cleaning of the glass, and so that the decoration becomes permanent and does not require the action of heat heretofore usual in affixing metallic ornamentations upon vitreous surfaces.

In carrying out my invention the surface of the glass or other vitreous material is to be carefully cleaned, and a stylus, in the form of a pencil or of a ball or small wheel to which movement is communicated, is brought into contact with the vitreous surface, and the ball or wheel may be revolved if desired, and by the contact of the aluminum with the vitreous surface and the motion, the metal is caused to adhere to the glass and be transferred from the stylus to such glass or vitreous surface.

Where the stylus is applied by hand, I find it advantageous to slightly moisten the surface of the glass by the breath or other vapor, but this does not leave the metallic surface as lustrous as when the moisture is avoided.

The metallic decoration thus produced is not easily obliterated except by the use of hydrochloric or similar acid. The ornamentation upon the vitreous surface with a stylus or pencil of aluminum may be of any desired shape or configuration, and the same is but little affected by atmospheric action.

I claim as my invention—

The method herein specified of ornamenting or marking glass or other vitreous surfaces, consisting in bringing into contact with such surface a stylus or marker of aluminum, and pressing and moving the same to cause a portion of the metal to adhere to and be transferred from the stylus to the glass or vitreous surface, substantially as set forth.

In testimony whereof I have signed my name to this specification in the presence of two subscribing witnesses.

CHARLES MARGOT.

Witnesses:
   E. IMER SCHNEIDER,
   OTTO MAY.